July 21, 1925.

W. BUDESHEIM

STEERING GEAR CHECK

Filed Sept. 6, 1923

1,547,021

Inventor
William Budesheim
By
J. R. Morrill
Attorney

Patented July 21, 1925.

1,547,021

UNITED STATES PATENT OFFICE.

WILLIAM BUDESHEIM, OF BALTIMORE, MARYLAND.

STEERING-GEAR CHECK.

Application filed September 6, 1923. Serial No. 661,230.

*To all whom it may concern:*

Be it known that I, WILLIAM BUDESHEIM, a citizen of the United States, residing at Baltimore, in the State of Maryland, have invented certain new and useful Improvements in Steering-Gear Checks, of which the following is a specification.

This invention relates to steering gear checks and has for an object to provide means for coacting with the steering gear of an automotive vehicle that shall check the vibrations of the steering gear and stabilize the movement of the vehicle.

A further object of the invention is to provide an improved type of tensioning means secured to the axle of the vehicle and exerting a checking tension upon the rod connecting the steering knuckles.

A further object of the invention is to provide improved means for attaching the tensioning member to the axle, whereby it is capable of co-acting with automotive vehicles of various makes models and types.

With these and other objects in view the invention comprises certain novel parts, elements, units, combinations and interactions, as disclosed in the drawings, together with mechanical equivalents thereof; as will be hereinafter more fully described and claimed.

In the drawings Figure 1 is a top plan view of a conventional front axle and a steering gear with check applied thereto.

Like characters of references indicate corresponding parts throughout the several views.

Figure 1:
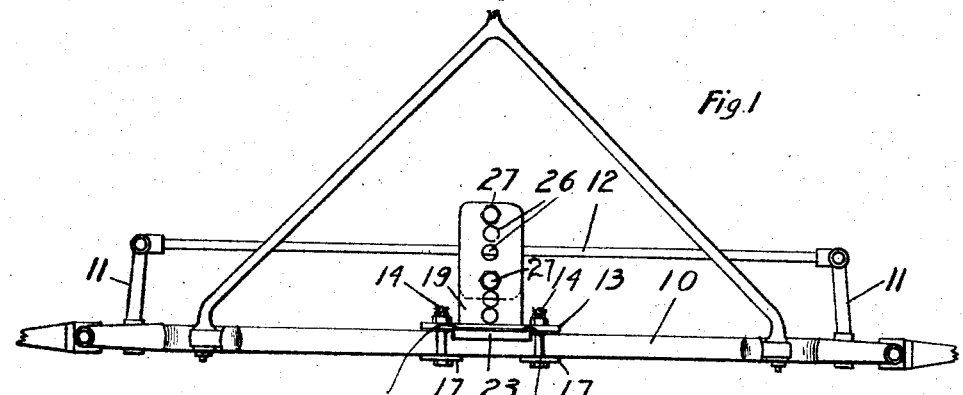

The improved gear check, which forms the subject matter of this application, is adapted to be associated and co-act with the front axles and steering gears of various types of automotive vehicles and the disclosure of an axle at 10, in the drawings, is not intended as indicating that the device is limited, in its utility, to such an axle as shown, said axle being shown only by way of illustration.

At its opposite ends the axle is provided with the usual and ordinary arms 11, for controlling the position of the knuckles, connected by a connecting rod 12. The parts thus enumerated are the parts ordinarily found upon an automotive vehicle, as at present produced, and is intended to cover all such types broadly.

Substantially mid-way the axle 10, the tensioning device of the present invention is applied, said device comprising a plate 13, clamped upon the rear side of the axle, in any approved manner, as by bolts 14, through perforations 15 in said plate and through registering openings 16 in straps 17.

The plate 13 is provided with a plurality of slots 18, through which the arm 19 is inserted, having its end 20 turned at right angles to the arm and seated in a groove formed by the shoulders 21 on the side of the plate 13 next to the axle, said slot being substantially the width of the part 20, so that angular movement of the arm relative to the plate is prevented. It is obvious that the arm 19 may be inserted through any of the several slots 18, in the plate and provision is made by the cut out parts 211 in the top and bottom of the plate so that the arm 19, may even occupy these extreme positions, the part 20 being turned either upwardly or downwardly as found necessary for properly positioning the tensioning attachment.

Figures 2, 3, 4:
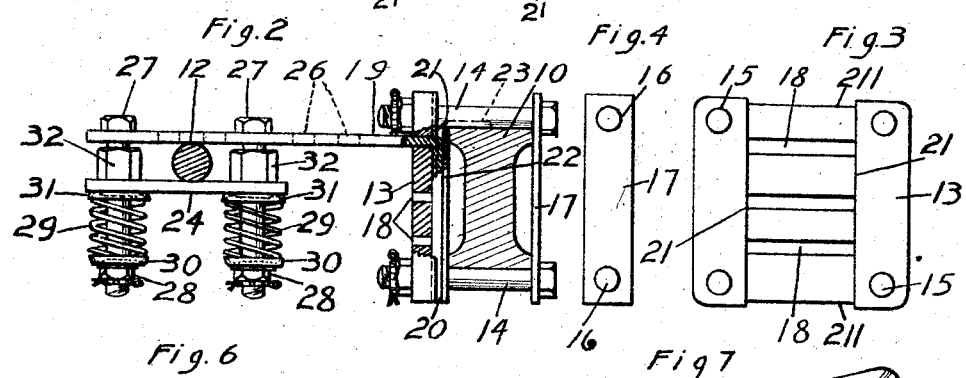
Figure 2 is a view of the check structure in side elevation, parts being broken away to show the means of assembling.
Figure 3 is a view in side elevation of the adjusting plate.
Figure 4 is a view in side elevation of one of the straps employed for clamping the device upon the axle.
Figure 6:
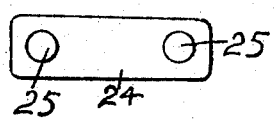
Figure 6 is a plan view of one member of the tension.
Figure 7:
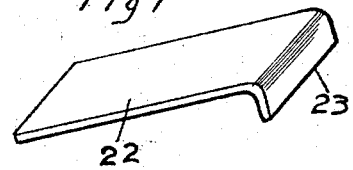
Figure 7 is a perspective view of the shim interposed between the axle and the supporting arm.
Figure 5:
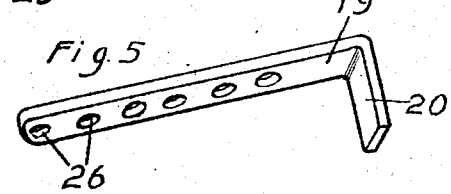
Figure 5 is a perspective view of the tension supporting arm.

As most axles are formed substantially as I-beams a shim 22 is provided, inserted between the part 20 of the arm and the axle, as indicated more particularly at Figure 2, having a flange 23, positioned to bear upon the top of the axle and support the shim in position. This prevents the arm 19 from being displaced and entering the side furrow of the axle.

The arm 19 extends outwardly beyond the rod 20, and either above or below said rod according to the relation of the parts. As shown in Figure 2, the arm 19 is located above the rod 12, but with the rod 12 located, as it may be in some types of vehicles, lower down relative to the axle, the tensioning means may be inverted and the arm 19 occupy a position beneath the rod 12. In either position, on the side of the rod 12 opposite the arm 19, a keeper plate 24 is employed, with perforations 25 registering with some of the pairs of perforations 26 in the arm 19, so that tensioning bolts 27 may be inserted through some of said openings 26, and through the openings 25, as the interval between the rod 12, and the axle may vary as required by such variations of connections.

The bolts 27 are provided with tension nuts 28 and with springs 29, interposed between washers 30 and 31, bearing respectively against the nuts 28, and the plate 24, whereby the plate 24 is bound yieldingly against the rod 12, the tension being variable by adjustment of the nuts 28.

Spacers 32 are interposed between the arm 19, and the plate 24, so that in case the rod 12 shall, in its movement, approach one of the bolts 27, the spring on the opposite bolt may not clamp the plate 24 and arm 19 together at such an angle as to make the return movement of the rod 12 difficult.

In operation the device is applied to the middle part of the front axle of automobiles or automotive vehicles, as indicated at Figures 1 and 2, extending rearwardly from said axle. The arm 19 is properly positioned in some of the slots 18, or cut outs 211, with either side up as occasion may require, so as to bear upon either the top or bottom of the rod 12. The plate 24 is then clamped in position and the proper or desired tension secured by the adjustment of the tensioning nuts 28, whereby the rod 12 is gripped in the tension to retard movement of said rod, as the wheels may strike obstructions, but yielding to manual stress applied for steering purposes in the usual manner.

I claim:

1. The combination with a front axle and a rod connecting steering knuckles spaced away from said axle, of an arm having tensioning means slidingly engaging said rod and a grid adapted to attach the arm to the axle at various predetermined vertical positions below the top of said axle.

2. A steering gear check comprising in combination with a steering gear embodying an axle and steering-knuckle-connecting rod spaced from the axle, a plate rigidly clamped to the axle and provided with a plurality of vertically arranged horizontally extending slots, an arm inserted through one of said slots selectively and provided with means for clamping the arm between the plate and the axle and tensioning means carried by the arm in slidable engagement with the rod.

In testimony whereof I affix my signature.

WILLIAM BUDESHEIM.